(12) United States Patent
Nayak et al.

(10) Patent No.: US 12,430,068 B2
(45) Date of Patent: Sep. 30, 2025

(54) MANAGING PROVENANCE INFORMATION FOR DATA PROCESSING PIPELINES

(71) Applicant: Telefonaktiebolaget LM Ericsson (publ), Stockholm (SE)

(72) Inventors: Sambit Nayak, Orissa (IN); Fredrik Svensson, Löberöd (SE); Anshu Shukla, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 558 days.

(21) Appl. No.: 17/780,427

(22) PCT Filed: Nov. 29, 2019

(86) PCT No.: PCT/EP2019/083117
§ 371 (c)(1),
(2) Date: May 26, 2022

(87) PCT Pub. No.: WO2021/104646
PCT Pub. Date: Jun. 3, 2021

(65) Prior Publication Data
US 2023/0004322 A1    Jan. 5, 2023

(51) Int. Cl.
*G06F 9/46*         (2006.01)
*G06F 3/06*         (2006.01)

(52) U.S. Cl.
CPC .......... *G06F 3/0658* (2013.01); *G06F 3/0607* (2013.01); *G06F 3/067* (2013.01)

(58) Field of Classification Search
CPC ....... G06F 3/0658; G06F 3/0607; G06F 3/067
See application file for complete search history.

(56) References Cited

U.S. PATENT DOCUMENTS

| | | |
|---|---|---|
| 2015/0339677 A1 | 11/2015 | Chan et al. |
| 2018/0113630 A1 | 4/2018 | Ishiguro |
| 2019/0045034 A1 | 2/2019 | Alam |

FOREIGN PATENT DOCUMENTS

| | | |
|---|---|---|
| EP | 3 128 447 A1 | 2/2017 |

OTHER PUBLICATIONS

International Search Report and Written Opinion issued in International Application No. PCT/EP2019/083117, dated Jul. 10, 2020 (16 pages).

*Primary Examiner* — Gregory A Kessler
(74) *Attorney, Agent, or Firm* — Rothwell, Figg, Ernst & Manbeck, P.C.

(57) ABSTRACT

A method for managing provenance information associated to one or more interconnected provenance entities in a provenance system for data processing pipelines in a distributed cloud environment over a network interface, wherein each of the data processing pipelines is configured to read in data, transform the data, and output transformed data is disclosed. The method comprises steps being performed by a configuration component of obtaining at least one declarative intent representing a configuration indicative of requirements and levels of priority for storage of provenance information for each of the data processing pipelines, deriving the requirements and levels of priority for storage of provenance information for each of the data processing pipelines based on the obtained at least one declarative intent, wherein one of the levels of priority—first level of priority—is higher than the other levels of priority—second levels of priority, estimating storage capacity for storage of provenance information in the provenance system based on the derived requirements and levels of priority, storing the provenance information according to the derived requirements and levels of priority for storage of provenance information and for each of the data processing pipelines, (Continued)

and when actual storage consumption for storage of provenance information in the provenance system meets a threshold of storage capacity set based on the estimated storage capacity: reducing a data amount for storage of provenance information of the second levels of priority in the provenance system. Corresponding computer program product, arrangement, configuration component, and system are also disclosed.

19 Claims, 5 Drawing Sheets

MANAGING PROVENANCE INFORMATION FOR DATA PROCESSING PIPELINES

CROSS REFERENCE TO RELATED APPLICATION(S)

This application is a 35 U.S.C. § 371 National Stage of International Patent Application No. PCT/EP2019/083117, filed Nov. 29, 2019.

TECHNICAL FIELD

The present disclosure relates generally to the field of provenance information. More particularly, it relates to managing provenance information in a provenance system for data processing pipelines in a distributed cloud environment over a network interface.

BACKGROUND

Provenance systems capture a massive amount of data over time i.e. provenance information, with the expectation that various kinds of provenance information, e.g. meta data, may become useful in various contexts, sometimes unexpectedly even.

As provenance systems may comprise a vast array of possible configuration and policy combinations, it may become difficult for system operator(s) to devise correct controls that will let the provenance system function well.

A first drawback of known configuration and policy combination for provenance systems is that coarse/fine configuration controls and policy/rule frameworks are required for system operator(s) to tune the system in order to satisfy having the data provenance information to be useful.

A second drawback of known configuration and policy combination for provenance systems is that a vast array of combinations of such controls and rules becomes too cumbersome to handle in order to correctly configure the system controls.

Therefore, there is a need for alternative approaches for managing provenance information in a provenance system for data processing pipelines in a distributed cloud environment over a network interface.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for managing provenance information associated to one or more interconnected provenance entities in a provenance system for data processing pipelines in a distributed cloud environment over a network interface, wherein each of the data processing pipelines is configured to read in data, transform the data, and output transformed data.

The method comprises steps being performed by a configuration component.

The method comprises obtaining at least one declarative intent representing a configuration indicative of requirements and levels of priority for storage of provenance information for each of the data processing pipelines, and deriving the requirements and levels of priority for storage of provenance information for each of the data processing pipelines based on the obtained at least one declarative intent, wherein one of the levels of priority—first level of priority—is higher than the other levels of priority—second levels of priority.

The method further comprises estimating storage capacity for storage of provenance information in the provenance system based on the derived requirements and levels of priority, storing the provenance information according to the derived requirements and levels of priority for storage of provenance information for each of the data processing pipelines, and when actual storage consumption for storage of provenance information in the provenance system meets a threshold of storage capacity set based on the estimated storage capacity: reducing a data amount for storage of provenance information of the second levels of priority in the provenance system.

In some embodiments, reducing the data amount for the storage of provenance information comprises transmitting a signal for causing any one of: compressing stored provenance information in local storage in the provenance system, removing indexing of stored provenance information in local storage in the provenance system, and moving stored compressed or non-compressed provenance information in local storage in the provenance system to remote storage in the distributed cloud environment.

In some embodiments, the at least one declarative intent representing the configuration is indicative of each of the data processing pipelines being associated with a corresponding level of priority based on one or more of: an age of the data processing pipelines, specific tags of the data processing pipelines, specific clients/groups of clients associated to the data processing pipelines, and specific data sources for the data processing pipelines.

In some embodiments, the at least one declarative intent representing the configuration is indicative of a time interval requirement for identifying a time interval during which the provenance information associated to the one or more interconnected provenance entities should be stored in the provenance system.

In some embodiments, the at least one declarative intent representing the configuration is indicative of a continuation requirement for continuously storing provenance information associated to the one or more interconnected provenance entities in the provenance system.

In some embodiments, the method further comprises notifying, by the configuration component, a client associated to the declarative intent that the stored provenance information is available for provision.

In some embodiments, the method further comprises providing the client with access to the stored provenance information over the network interface.

In some embodiments, the method further comprises providing the client with data streams of the stored provenance information over the network interface.

In some embodiments, the provided access to or data streams of the stored provenance information to the client serves as data for any one of: debugging, analysis queries, scheduling, and optimizations.

In some embodiments, the provenance information comprises one or more of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

In some embodiments, the one or more interconnected provenance entities in the provenance system represent one or more interconnected nodes of a graph structure and the interconnections represent edges and relationships between the nodes of a subgraph of the graph structure.

In some embodiments, the graph structure is a graph database.

In some embodiments, the configuration component comprises a plurality of sub-components each acting as a separate configuration component for a corresponding data processing pipeline.

In some embodiments, the stored provenance information relates to any one of: industrial robotics, sensors in a building, and production machines.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a configuration component adapted for managing provenance information associated to one or more interconnected provenance entities in a provenance system for data processing pipelines in a distributed cloud environment over a network interface, wherein each of the data processing pipelines is configured to read in data, transform the data, and output transformed data.

The arrangement comprises a controller configured to cause obtainment of at least one declarative intent representing a configuration indicative of requirements and levels of priority for storage of provenance information for each of the data processing pipelines, and derivation of the requirements and levels of priority for storage of provenance information for each of the data processing pipelines based on the obtained at least one declarative intent, wherein one of the levels of priority—first level of priority—is higher than the other levels of priority—second levels of priority.

The controller is further configured to cause estimation of storage capacity for storage of provenance information in the provenance system based on the derived requirements and levels of priority, storage of the provenance information according to the derived requirements and levels of priority for storage of provenance information and for each of the data processing pipelines, and when actual storage consumption for storage of provenance information in the provenance system meets a threshold of storage capacity set based on the estimated storage capacity: reduction of a data amount for storage of provenance information of the second levels of priority in the provenance system.

In some embodiments, reduction of the data amount for the storage of provenance information comprises transmittal of a signal for causing any one of: compression of stored provenance information in local storage in the provenance system, removal of indexing of stored provenance information in local storage in the provenance system, and move of stored compressed or non-compressed provenance information in local storage in the provenance system to remote storage in the distributed cloud environment.

In some embodiments, the at least one declarative intent representing the configuration is indicative of each of the data processing pipelines being associated with a corresponding level of priority based on one or more of: an age of the data processing pipelines, specific tags of the data processing pipelines, specific clients/groups of clients associated to the data processing pipelines, and specific data sources for the data processing pipelines.

In some embodiments, the at least one declarative intent representing the configuration is indicative of a time interval requirement for identifying a time interval during which the provenance information associated to the one or more interconnected provenance entities should be stored in the provenance system.

In some embodiments, the at least one declarative intent representing the configuration is indicative of a continuation requirement for continuously storing provenance information associated to the one or more interconnected provenance entities in the provenance system.

In some embodiments, the controller is further configured to cause notification to a client associated to the declarative intent that the stored provenance information is available for provision.

In some embodiments, the arrangement is further configured to cause provision with access to the stored provenance information to the client over the network interface.

In some embodiments, the arrangement is further configured to cause provision with data streams of the stored provenance information to the client over the network interface.

In some embodiments, the provision with access to or data streams of the stored provenance information to the client serves as data for any one of: debugging, analysis queries, scheduling, and optimizations.

In some embodiments, the provenance information comprises one or more of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

In some embodiments, the one or more interconnected provenance entities in the provenance system represent one or more interconnected nodes of a graph structure and the interconnections represent edges and relationships between the nodes of a subgraph of the graph structure.

In some embodiments, the graph structure is a graph database.

In some embodiments, the arrangement for the configuration component comprises a plurality of sub-components each acting as a separate configuration component for a corresponding data processing pipeline.

In some embodiments, the stored provenance information relates to any one of: industrial robotics, sensors in a building, and production machines.

A fourth aspect is a configuration component comprising the arrangement according to the third aspect.

A fifth aspect is a system comprising the arrangement according to the third aspect and/or the configuration component according to the fourth aspect.

In some embodiments, the system further comprises at least one client, a local storage, and a remote storage.

Any of the above aspects may additionally have features identical with or corresponding to any of the various features as explained above for any of the other aspects.

An advantage of some embodiments is that alternative approaches for managing provenance information in a provenance system for data processing pipelines in a distributed cloud environment over a network interface are provided.

Another advantage of some embodiments is that coarse/fine configuration controls and policy/rule frameworks for system operator(s) to tune the system may be alleviated.

Yet an advantage of some embodiments is that the cumbersome handling of the vast array of combinations of controls and rules to correctly configure the system controls may be alleviated.

Yet another advantage of some embodiments is that required provenance information is stored in the provenance system while conforming to the resource capacity limits at various locations in the distributed cloud environment.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, provenance systems capture a massive amount of provenance information over time.

Provenance systems may provide configuration controls, and/or a policy framework to allow the system operator(s) to control aspects like which kinds of provenance information, e.g. metadata, should be captured, under what conditions capturing and/or storing should be performed, what kinds of representations (e.g., compressed or not etc.) and/or storage backend (e.g., slow/fast, local/remote, etc.) should be used to store such provenance information, etc. Such configurations and policies/rules become especially important to tune and frame in the face of distributed cloud topology, with different storage locations having different resource capabilities/limits and heterogeneous resources (e.g., compute, storage, network etc.).

In the following, embodiments will be presented where alternative approaches for managing provenance information in a provenance system for data processing pipelines in a distributed cloud environment over a network interface are described.

Managing provenance information, as described herein, comprises obtaining (e.g. retrieving) at least one declarative intent, deriving the requirements and levels of priority, estimating storage capacity, storing the provenance information, and reducing a data amount for storage (e.g. mitigating).

A provenance system comprises provenance information of one or more (directly or indirectly; e.g., operationally or virtually) interconnected provenance entities stored via one or more routing components over network interfaces on software systems (e.g. provenance brokers) of actual networked hardware.

Figure 1:
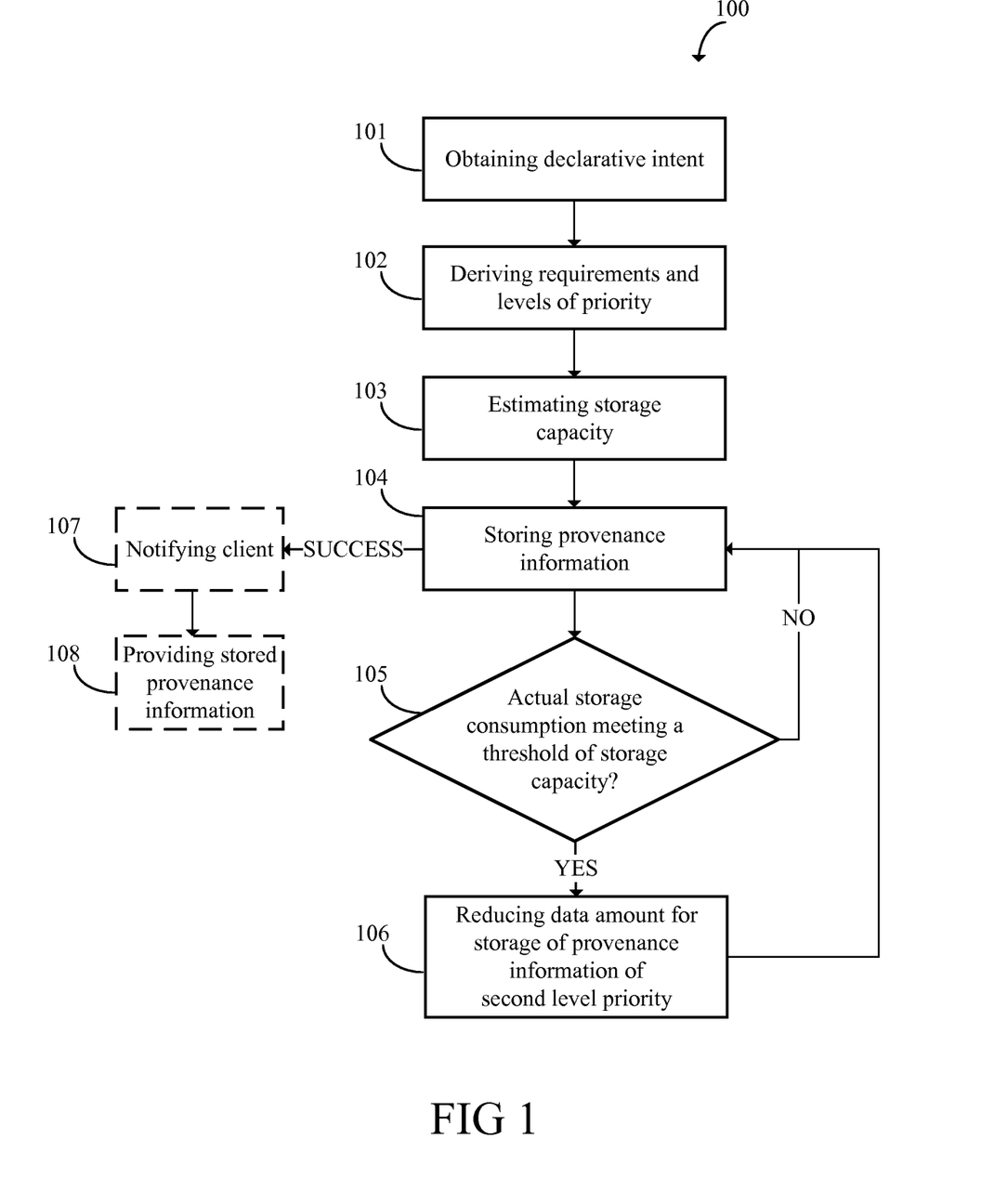
FIG. 1 is a flowchart illustrating example method steps according to some embodiments.

FIG. 1 is a flowchart illustrating method steps of an example managing method 100 according to some embodiments. The managing method 100 is for managing provenance information associated to one or more interconnected provenance entities in a provenance system for data processing pipelines in a distributed cloud environment over a network interface. Thus, the managing method 100 may, for example, be performed by the arrangement 400 of FIG. 4 and/or the processor 520 in the computer program product 500 of FIG. 5; both of which will be described later herein.

In some embodiments, the provenance information comprises one or more of: information on where data was collected, information on for what purpose data was collected, information on for what context data was collected, information on for whom data was collected, information on who has accessed the collected data, attributes of the collected data, updates to the collected data, creation of the collected data, and lineage of collected data, depending on data type and environment of collection.

In some embodiments, the one or more interconnected provenance entities in the provenance system represent one or more interconnected nodes of a graph structure and the interconnections represent edges and relationships between the nodes of a subgraph of the graph structure.

In some embodiments, the graph structure is a graph database.

In some embodiments, the configuration component comprises a plurality of sub-components each acting as a separate configuration component for a corresponding data processing pipeline.

In some embodiments, the stored provenance information relates to any one of: industrial robotics, sensors in a building, and production machines.

The managing method 100 comprises the following steps being performed by a configuration component.

In step 101, at least one declarative intent representing a configuration indicative of requirements and levels of priority for storage of provenance information is obtained for each of the data processing pipelines.

Alternatively or additionally, obtaining the at least one declarative intent may comprise receiving or retrieving the at least one declarative intent from a client or the provenance system.

Alternatively or additionally, the at least one declarative intent represents a higher-order provenance requirement for data processing pipelines, indicative of low-order details of such metadata requirements and levels of priority for storage of provenance information for such data processing pipelines.

In some embodiments, the at least one declarative intent representing the configuration is indicative of each of the data processing pipelines being associated with a corresponding level of priority based on one or more of: an age of the data processing pipelines, specific tags of the data processing pipelines, specific clients/groups of clients associated to the data processing pipelines, and specific data sources for the data processing pipelines.

In some embodiments, the at least one declarative intent representing the configuration is indicative of a time interval requirement for identifying a time interval during which the provenance information associated to the one or more interconnected provenance entities should be stored in the provenance system.

In some embodiments, the at least one declarative intent representing the configuration is indicative of a continuation requirement for continuously storing provenance information associated to the one or more interconnected provenance entities in the provenance system.

In step 102, the requirements and levels of priority for storage of provenance information for each of the data processing pipelines are derived based on the obtained at least one declarative intent, wherein one of the levels of priority—first level of priority—is higher than the other levels of priority—second levels of priority.

For example, the levels of priority may comprise at least two levels of priority or a plurality of levels of priority, wherein one of the levels of priority is higher than the other levels of priority.

For example, when the at least one declarative intent comprising the higher-order provenance requirement indicates "store provenance to debug data processing pipelines deployed in the last week", the system has to first determine "what constitutes provenance information to debug data processing pipelines". The provenance information may then comprise details about each stage of a data processing pipeline, code version/commits each stage is related to, inputs and outputs of each stage, definitions of each stage of the data processing pipeline (e.g., is it a docker image, is it a function in some framework, etc.), and so on. Then the system also determines from this "intent" that the priority of such provenance information for each deployed data processing pipeline reduces after a week. Similarly, some hints about priority could be based on the user/group etc. that the data processing pipeline is relevant to and so on.

For example, when the at least one declarative intent comprising the higher-order provenance requirement indicates "provenance about access to dataset X, e.g., a DB table, or a message queue topic, by data pipelines", the system will store metadata/provenance information around access to that specific dataset, and not necessarily all lineage.

In step 103, storage capacity for storage of provenance information in the provenance system is estimated based on the derived requirements and levels of priority.

Alternatively or additionally, the estimated storage capacity comprises the storage capacity for all provenance information (i.e. including provenance information of all available levels of priority).

For example, the estimated storage capacity may be utilized to set a threshold for actual storage consumption for storage of provenance information in the provenance system when corrective actions may be initiated, i.e. reducing the data amount in the provenance system.

For example, the estimated storage capacity may also be utilized to determine how much storage should be freed up, i.e. if it is satisfiable to reduce storage for the second level or lower levels of priority etc.

In step 104, the provenance information is stored according to the derived requirements and levels of priority for storage of provenance information and for each of the data processing pipelines.

Alternatively or additionally, the provenance information associated to the one or more interconnected entities may be stored locally in the provenance system for data processing pipelines in a distributed cloud environment over a network interface.

In step 105, it is determined whether actual storage consumption for storage of provenance information in the provenance system meets a threshold of storage capacity set based on the estimated storage capacity.

For example, the threshold may have been set in response to the estimating of the storage capacity (see step 103).

When it is determined that actual storage consumption for storage of provenance information in the provenance system meets a threshold of storage capacity set based on the estimated storage capacity (YES-path out of step 105), the method proceeds to step 106. Otherwise (NO-path out of step 105), the method returns to step 104.

In step 106, a data amount for storage of provenance information of the second levels of priority is reduced in the provenance system.

For example, the data amount to be reduced, i.e. freed up, may have been determined in response to the estimating of the storage capacity (see step 103).

In some embodiments, the reducing the data amount for the storage of provenance information comprises transmitting a signal for causing any one of: compressing stored provenance information in local storage in the provenance system, removing indexing of stored provenance information in local storage in the provenance system, and moving stored compressed or non-compressed provenance information in local storage in the provenance system to remote storage in the distributed cloud environment.

Alternatively or additionally, the results of step 106 is fed into step 104 in order to signify that space is freed, and that further provenance information may be stored accordingly.

In optional step 107, in some embodiments, when provenance information has been stored successfully in step 104, a client associated to the declarative intent is notified by the configuration component that the stored provenance information is available for provision.

For example, the configuration component may publish such information in a data message as a streamed Hypertext Transfer Protocol (HTTP) response, etc.

In optional step 108, in some embodiments, the client is provided with access to the stored provenance information over the network interface.

Alternatively or additionally, provisioning may be performed by either the configuration(s) component or routing component(s) or any other component associated to the configuration/routing component adapted to provide access and/or data streams accordingly.

For example, the provision of the stored provenance information may comprise copying data or referencing individual or ranges of data for later look-up from local storage and/or remote storage in the provenance system.

In some embodiments, the provided access to or data streams of the stored provenance information to the client serves as data for any one of: debugging, analysis queries, scheduling, and optimizations.

In some embodiments, steps 103, 104, 105, and 106 are repeated so that actual storage consumption for storage of provenance information in the provenance system does not exceed the storage capacity of the provenance system.

Hence, in view of above method steps, managing provenance information in a provenance system for data processing pipelines in a distributed cloud environment over a network interface is enabled.

Figure 2A:
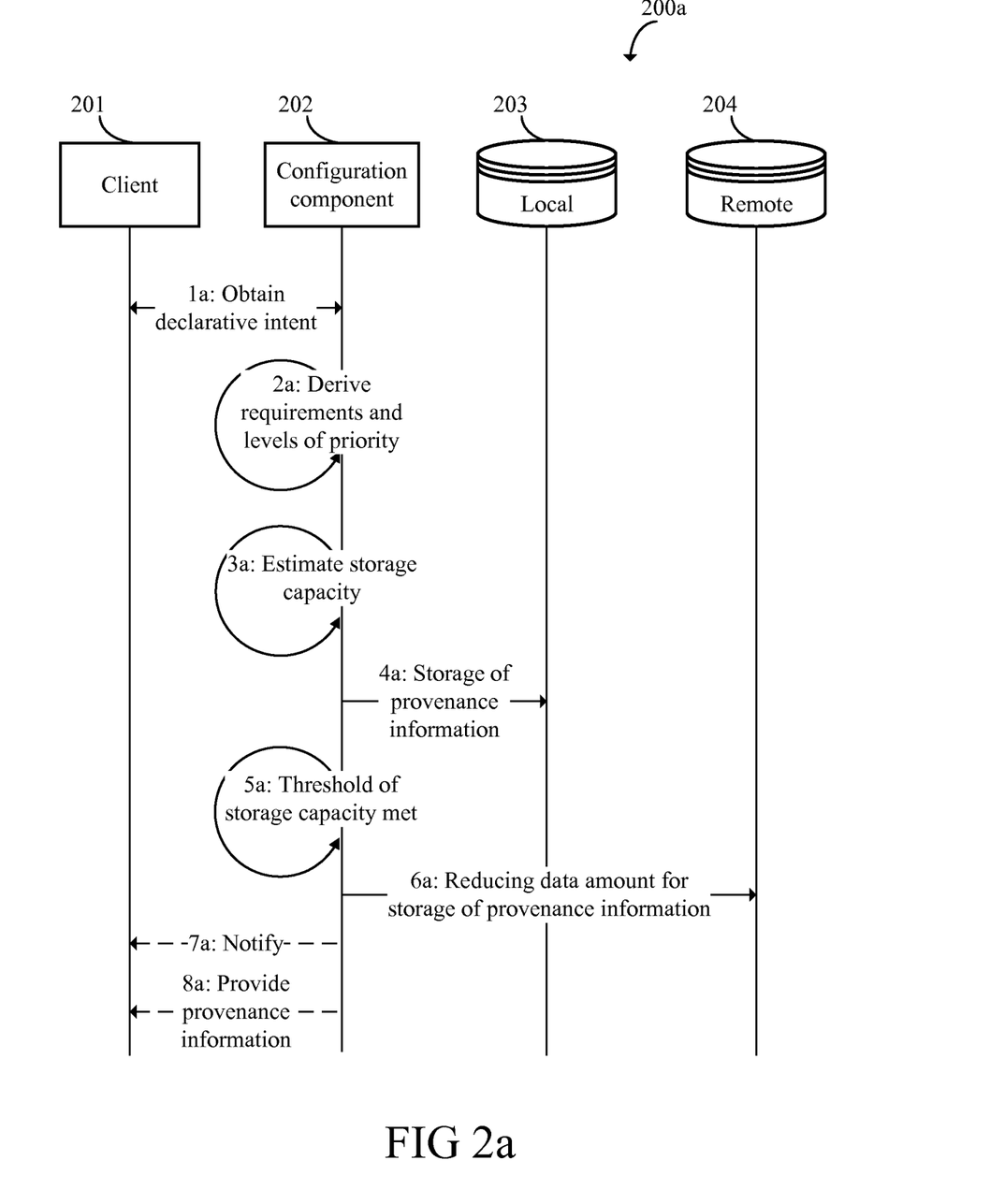
FIG. 2a is a sequence diagram illustrating example sequence steps according to some embodiments.

FIG. 2a is a sequence diagram illustrating sequence steps of an example managing sequence 200a according to some embodiments. The managing sequence 200a is for managing provenance information associated to one or more interconnected provenance entities in a provenance system for data processing pipelines in a distributed cloud environment over a network interface. Thus, the managing sequence 200a may, for example, be performed by the arrangement 400 of FIG. 4 and/or the processor 520 in the computer program product 500 of FIG. 5; both of which will be described later herein.

The managing sequence 200a comprises the following steps being performed by a provenance system comprising client 201, a configuration component 202, a local storage 203, and a remote storage 204.

In step 1a, corresponding to step 101 of FIG. 1, at least one declarative intent representing a configuration indicative of requirements and levels of priority for storage of provenance information is obtained by a configuration component 202 from a client 201 for each of the data processing pipelines.

In step 2a, corresponding to step 102 of FIG. 1, the requirements and levels of priority for storage of provenance information for each of the data processing pipelines are derived by the configuration component 202 based on the obtained at least one declarative intent, wherein one of the levels of priority—first level of priority—is higher than the other levels of priority—second levels of priority.

In step 3a, corresponding to step 103 of FIG. 1, storage capacity for storage of provenance information in the provenance system is estimated by the configuration component 202 based on the derived requirements and levels of priority.

In step 4a, corresponding to step 104 of FIG. 1, the provenance information is stored in local storage 203 in the provenance system by the configuration component 202 according to the derived requirements and levels of priority for storage of provenance information and for each of the data processing pipelines.

In step 5a, corresponding to step 105 of FIG. 1, it is determined by the configuration component 202 when actual storage consumption for storage of provenance information in the provenance system meets a threshold of storage capacity set based on the estimated storage capacity.

In step 6a, corresponding to step 106 of FIG. 1, a data amount for storage of provenance information of the second levels of priority is reduced in the provenance system by the configuration component 202 by moving the data amount to be reduced from the local storage 203 in the provenance system to a remote storage 204 in the distributed cloud environment over a network interface.

In optional step 7a, corresponding to step 107 of FIG. 1, in some embodiments, the client 201 associated to the declarative intent is notified by the configuration component 202 that the stored provenance information is available for provision.

In optional step 8a, corresponding to step 108 of FIG. 1, in some embodiments, the client 201 is provided with access to the stored provenance information by the configuration component 202 over the network interface.

Hence, in view of above sequence steps, managing provenance information in a provenance system for data processing pipelines in a distributed cloud environment over a network interface is enabled.

Figure 2B:
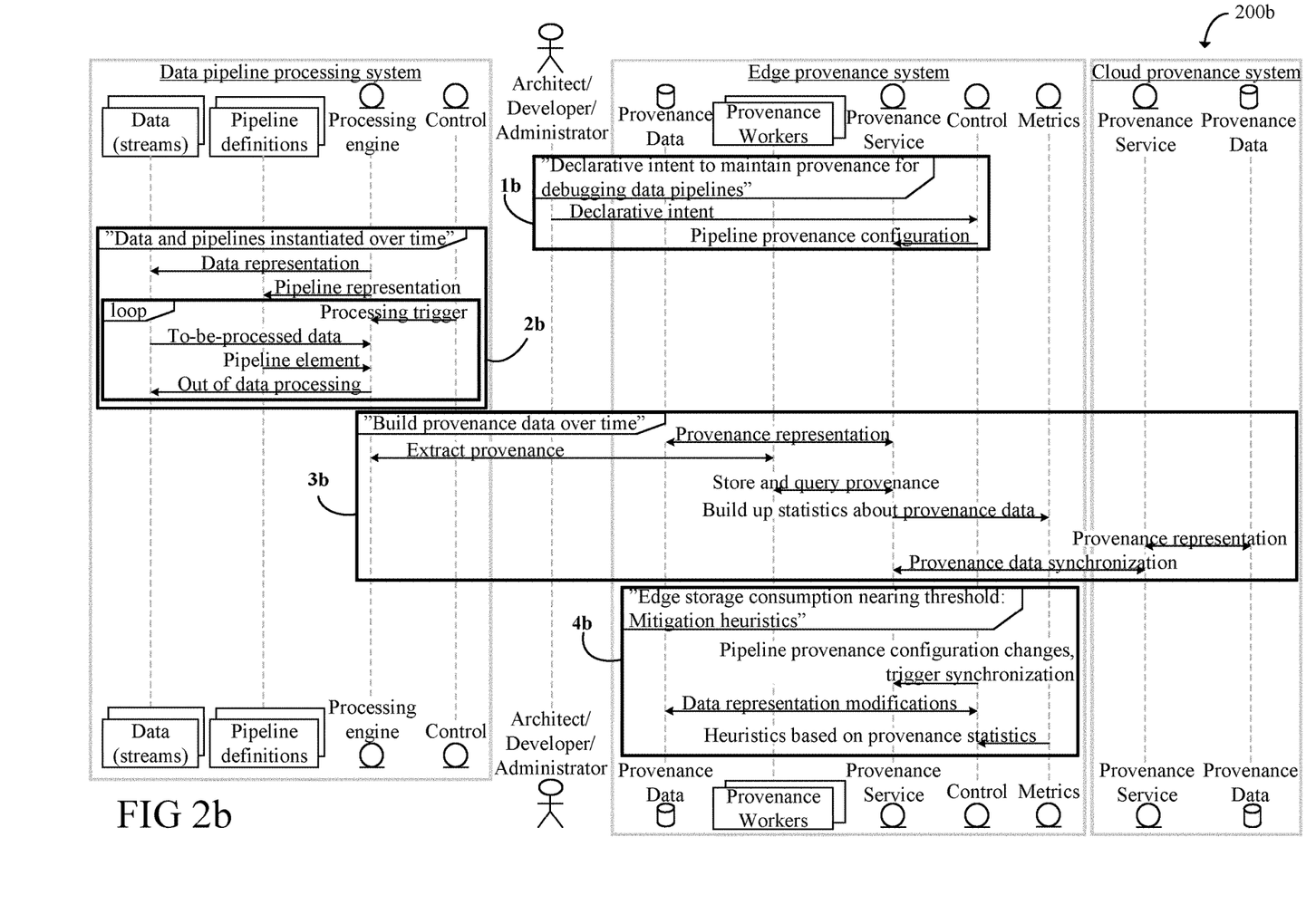
FIG. 2b is a sequence diagram illustrating example sequence steps according to some embodiments.

FIG. 2b is a sequence diagram illustrating sequence steps of an example managing sequence 200b according to some embodiments. The managing sequence 200b is for managing provenance information associated to one or more interconnected provenance entities in a provenance system for data processing pipelines in a distributed cloud environment over a network interface. Thus, the managing sequence 200b may, for example, be performed by the arrangement 400 of FIG. 4 and/or the processor 520 in the computer program product 500 of FIG. 5; both of which will be described later herein.

Generally, the provenance system supports various configurations options and rules; examples including:

Provenance features available—coarse-grained provenance like streaming topics and users and operations accessing such topics (lineage relationships between them), or fine-grained provenance like lineage relationships between individual messages across streams. Typically, fine-grained message/record provenance is quite useful for debugging data pipeline operations on such messages (e.g., Apache NiFi provenance).

Multiple possible metadata representation formats—property graph, RDF, simple text log, compressed or not, etc.

Resource (compute, storage, network) availability limits for metadata available at the various locations, and characteristics of such resources (e.g., storage IOPS/latency, compute cores/speed, network bandwidth, etc.).

The provenance system may define a data processing pipeline (sources, sinks, processing, routes, etc.), and is interested to have enough provenance information for the operation of the data processing pipeline, at least for the first month the pipeline is in action. This intent is captured by the solution using a user dialog, or something similar.

The provenance system translates requirements/intent from the user into policies/rules governing its actions/configuration internally. Such policies aim to strike a balance between resource consumption at edge vs. unavailability of such provenance info at edge, in case of network partition with cloud.

What to store: The system translates the intent to mean that it will store detailed provenance information for a data pipeline (say, fine-grained record provenance for streaming data pipelines), for the first month of the pipeline's existence.

Where to store: For the processing elements of a data pipeline located at an edge location, the system will:
store detailed provenance at edge,
build statistical information over time regarding storage consumption by detailed provenance, queries being performed on such detailed provenance (debugging, analysis queries) and their response times,
in cases where the system nears edge storage limits, transform the relatively older provenance information (say, older than last 2 days, or as a daily night batch job) into formats occupying lesser storage (compression, or alternate formats), or slower storage, or say adopt practices like remove indexing, while possibly sacrificing query responsiveness on such alternative representation. In cases where edge storage is really under pressure, push out the provenance information to cloud, and optionally keep high-level provenance actions/events or critical events at the edge.

For such processing elements of a pipeline located at the cloud location, the system can opt similar practices to optimize the overall storage consumption cost on alternative storage solutions (say, slower vs faster storage, object storage vs graph database, etc.)

Older pipelines vs new: The solution system prioritizes metadata about newer pipelines at edge in favor of relatively older pipelines, when edge storage is severely constrained. And the system will do similar mitigation actions as described above (transform to alternate formats, remove indexing, push to cloud, etc.) for older pipeline metadata.

The provenance system also takes into account higher level quota limits in a multi-tenant system. For instance, in a tenant group with an overall storage quota on edge/cloud, the system will take into account priorities assigned to users in that tenant group to decide priorities for metadata about the data pipelines defined by such users. Thus, the solution system can follow mitigation procedures for lower priority users' data pipelines when resources fall short. An individual user can also define priorities for the data pipelines—if the data processing system supports such feature—and the solution system could use such priorities to distinguish between various data pipelines defined by a single user.

The provenance system also maintains statistical information about the provenance data, and uses such provenance to adopt mitigation strategies like the above. Some examples are described below.

Pipeline provenance resource consumption: Some data pipelines may be more active or fast (faster stream processing) than others, and hence the fine-grained provenance information for those accumulate faster. The solution system can choose to adopt strategies of alternate representation (e.g., compression, etc.) or only store critical events (e.g., failures, alerts, etc.) about such pipelines, and move non-critical provenance to other storage (slow, cheap) or cloud.

Provenance data access history: The system can maintain statistics about queries on such pipeline provenance data, to gauge the criticality of certain data pipelines over others and apply earlier mentioned mitigation strategies (for the interim) to provenance data of other pipelines.

Failed/buggy pipelines: Provenance information like which pipelines have encountered failures, have been or could be buggy (provenance tags, experimental versions and branches of code for pipelines) are also used by the solution system to prioritize provenance information for such pipelines.

The managing sequence 200b comprises the following sections of steps being performed by a provenance system comprising a client, i.e. Architect/Developer/Administrator, corresponding to client 201 of FIG. 2a, a component, i.e. Control, corresponding to configuration component 202 of FIG. 2a, local storage, i.e. Edge provenance system, corresponding to local storage 203 of FIG. 2a, and remote storage, i.e. Cloud provenance system, corresponding to remote storage 204 of FIG. 2a.

In a first section of steps 1b: "Declarative intent to maintain provenance for debugging data pipelines" (compare with step 101 of FIG. 1 and step 1a of FIG. 2a), at least one declarative intent representing a configuration indicative of requirements and levels of priority for storage of provenance information is obtained by the Control from the Architect/Developer/Administrator for each of the data processing pipelines.

Following, (compare with step 102 of FIG. 1 and step 2a of FIG. 2a), requirements and levels of priority for storage of provenance information for each of the data processing pipelines are derived based on the obtained at least one declarative intent, wherein one of the levels of priority—first level of priority—is higher than the other levels of priority—second levels of priority.

Further, (compare with step 103 of FIG. 1 and step 3a of FIG. 2a), a storage capacity for storage of provenance information in the provenance system is estimated based on the derived requirements and levels of priority.

The Control further delegates the task of configuring the storage of provenance information to the Provenance Service.

In a second section of steps 2b: "Data and pipelines instantiated over time", each of the data processing pipelines is configured to read in data, transform the data, and output transformed data.

The Processing engine is further responsible for looping the processing of the data of each of the data processing pipelines.

For example, various kinds of transformations on data before storing such data into end storage systems may be performed. Some examples of transformations may comprise format conversions, field extractions, joins; or complex ones like iterative machine model generation and tuning with loops in such pipelines. Some examples of end storage systems are various kinds of databases (Relational, NoSQL, Time-series), object storage (AWS S3), etc. Furthermore, multiple users—developers, data architects, machine learning or data engineers—define such data pipelines on such data flow software systems, that could span on-premise and/or cloud hosted systems In a third section of steps 3b: "Build provenance data over time" (compare with step 104 of FIG. 1 and step 4a of FIG. 2a), the provenance information is stored in the Edge provenance system in the provenance system by the Provenance Service, of which the Control has delegated this task to, according to the derived requirements and levels of priority for storage of provenance information and for each of the data processing pipelines.

A corresponding Provenance Service is available in the Cloud provenance system for further storage of provenance information in the distributed cloud environment over a network interface.

For example, provenance and/or metadata systems for data flow systems help to model and record aspects like associations, versioning relationships, lineage etc. for data and operations in such systems. It is typical for such provenance information and/or metadata to be quite voluminous—even larger than the actual data itself at times. Further, such provenance information and/or metadata systems as well as data flow systems can span over a distributed environment consisting of one or more edge and cloud locations (e.g. data centres) and such various locations in a distributed environment have their own individual compute, storage, network resource capability limits.

In the fourth section of steps 4b: "Edge storage consumption nearing threshold: Mitigation heuristics" (compare with step 105 of FIG. 1 and step 5a of FIG. 2a), it is determined by the Control when actual storage consumption for storage of provenance information in the provenance system nears, e.g. meets, a threshold of storage capacity set based on estimated storage capacity.

Following, (compare with step 106 of FIG. 1 and step 6a of FIG. 2a), the Control initiates via the Provenance Service reduction of a data amount for storage of provenance information of the second levels of priority in the Edge provenance system.

For example, the reduction of the data amount may comprise moving the data amount to be reduced from the Edge provenance system in the provenance system to the corresponding location in the Cloud provenance system, i.e. the distributed cloud environment, in the provenance system over a network interface or alternative approaches such as changing format/indexing of provenance information on edge storage.

Therefore, above sections of steps enable provenance systems to turn declarative intent—for provenance usage and elements of provenance information for data processing pipelines—into requirements for maintaining essential provenance information in a distributed cloud setting, and derive configuration and policy controls, as well as, adopt strategies to meet the provenance requirements in the face of resource capacity restrictions, over the distributed cloud setting.

Hence, in view of above sequence steps, managing provenance information in a provenance system for data processing pipelines in a distributed cloud environment over a network interface is enabled.

Figure 3A:
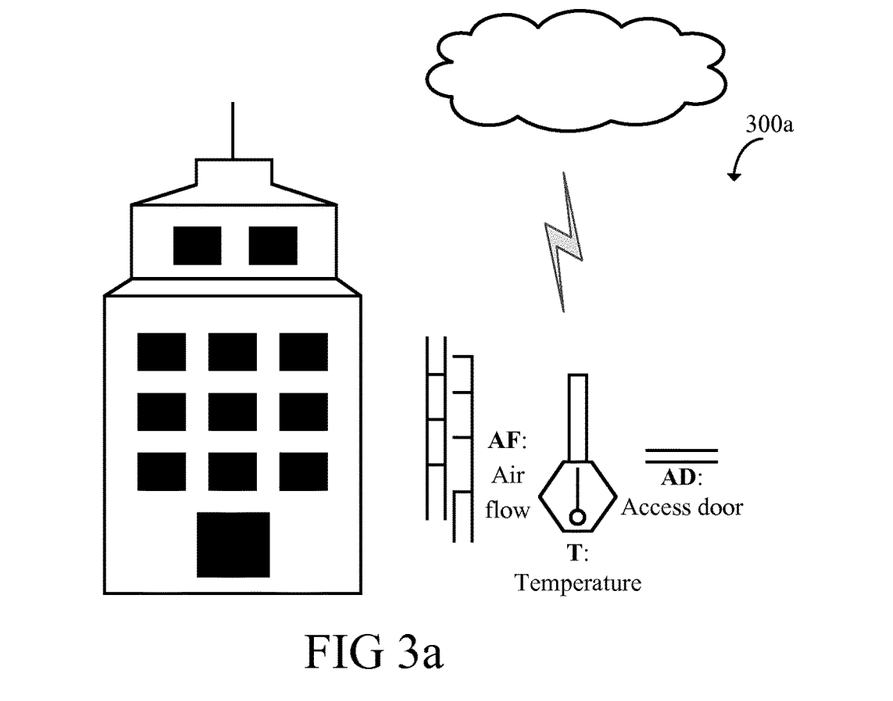
FIG. 3a is a schematic drawing illustrating example sensors of an example environment according to some embodiments.

FIG. 3a is a schematic drawing illustrating sensors of an example environment 300a according to some embodiments. The sensors and the example environment 300a are for obtaining and providing provenance information associated to one or more interconnected provenance entities for storage in a provenance system. Thus, the environment 300a may, for example, be comprised in a system comprising the arrangement 400 of FIG. 4 and/or the processor 520 in the computer program product 500 of FIG. 5; both of which will be described later herein.

Figure 4:
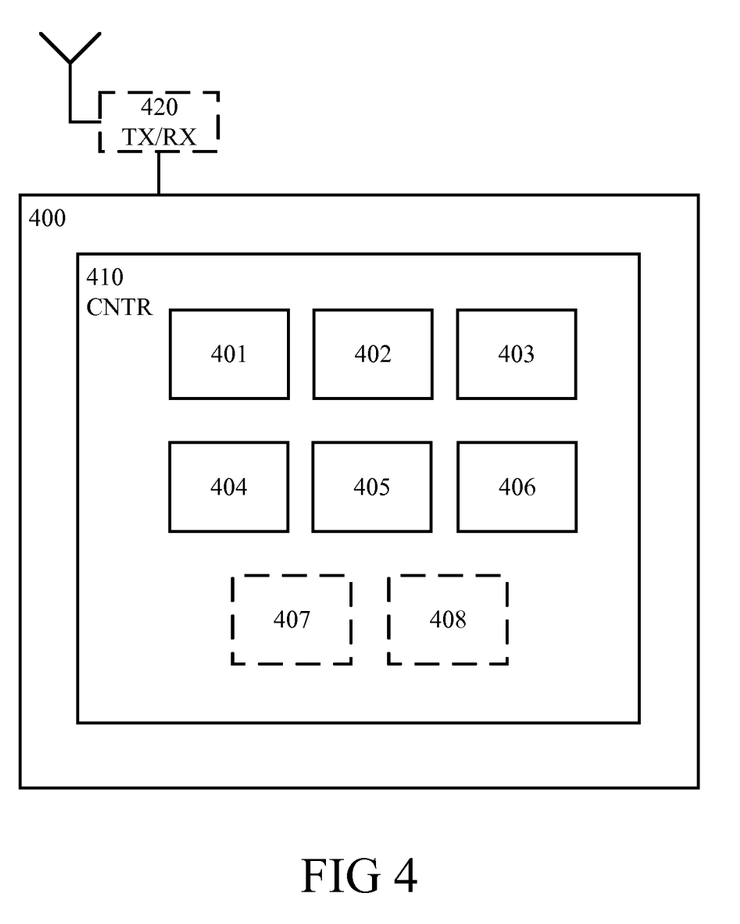
FIG. 4 is a schematic block diagram illustrating an example arrangement according to some embodiments.

Alternatively or additionally, the system may comprise a configuration component adapted for managing provenance information and/or the arrangement 400 for the configuration component of FIG. 4.

For example, the configuration component may comprise the arrangement 400 of FIG. 4.

The system may, in some embodiments, further comprise at least one client 201, a local storage 203, and a remote storage 204.

FIG. 3a illustrates a building comprising at least one sensor. The at least one sensor may comprise any one of a sensor for air flow AF, a sensor for temperature T, and a sensor for door accesses AD. The at least one sensor is configured to obtain data, i.e. provenance information, according to the purpose of the sensor and provide the provenance information to a provenance system. Hence, the at least one sensor and its data stream are represented by one or more interconnected provenance entities in the provenance system, wherein the provenance entities may comprise a sub-graph of a graph structure.

In some embodiments, the graph structure is a graph database.

Hence, in view of above, obtaining and providing provenance information associated to one or more interconnected provenance entities for storage in a provenance system is enabled.

Figure 3B:
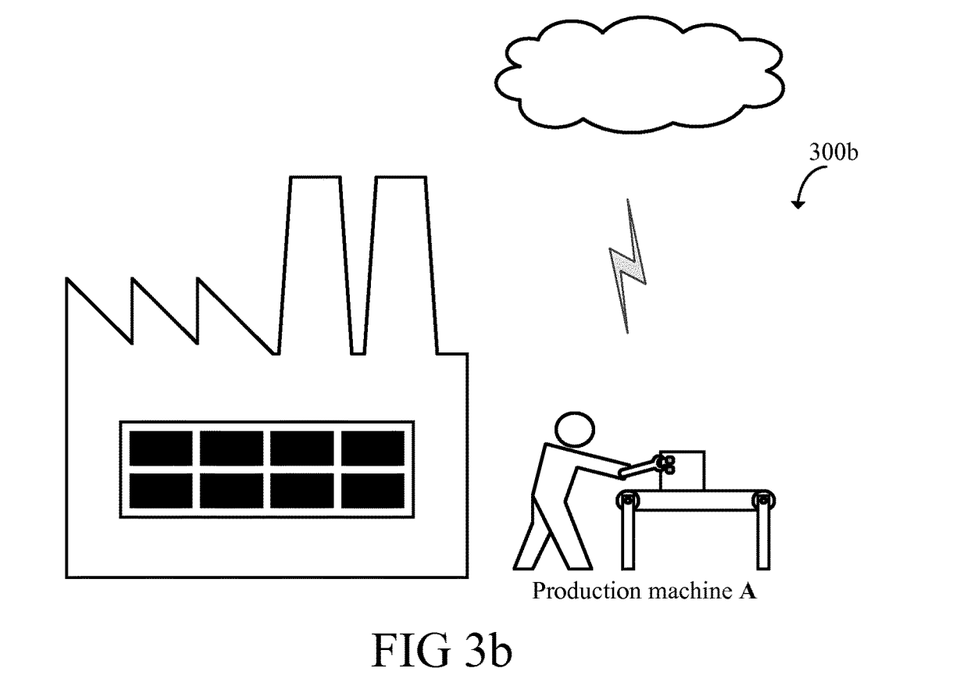
FIG. 3b is a schematic drawing illustrating example sensors of an example environment according to some embodiments.

FIG. 3b is a schematic drawing illustrating sensors of an example environment 300b according to some embodiments. The sensors and the example environment 300b are for obtaining and providing provenance information associated to one or more interconnected provenance entities for storage in a provenance system. Thus, the environment 300b may, for example, be comprised in a system comprising the arrangement 400 of FIG. 4 and/or the processor 520 in the computer program product 500 of FIG. 5; both of which will be described later herein.

Alternatively or additionally, the system may comprise a configuration component adapted for managing provenance information and/or the arrangement 400 for the configuration component of FIG. 4.

For example, the configuration component may comprise the arrangement 400 of FIG. 4.

The system may, in some embodiments, further comprise at least one client 201, a local storage 203, and a remote storage 204.

FIG. 3b illustrates a factory (or industrial plant) comprising at least one sensor arranged on machines and/or equipment e.g. production machine A. The at least one sensor may comprise any one of a sensor for indicating status of machinery, a sensor for internal temperature of machinery, a pressure sensor, a proximity sensor, an optical sensor, and a position sensor. The at least one sensor is configured to obtain data, i.e. sensor data, according to the purpose of the sensor and provide the data to a provenance system.

For example, the sensor outputs obtained data, which goes to a topic of one or more interconnected provenance entities in the provenance system. So, example provenance entities may comprise the provenance graph entity representing the sensor (e.g., its configuration, information etc.), and the graph entity representing the streaming message queue topic to which it is pushing data to (e.g., metadata about that topic—its schema, etc.).

Hence, the at least one sensor is represented by one or more interconnected provenance entities in the provenance system, wherein the provenance entities may comprise a sub-graph of a graph structure.

Hence, in view of above, obtaining and providing provenance information associated to one or more interconnected provenance entities for storage in a provenance system is enabled.

FIG. 4 is a schematic block diagram illustrating an example managing arrangement 400 according to some embodiments. The managing arrangement 400 is for a configuration component, wherein the configuration component is adapted for managing provenance information associated to one or more interconnected provenance entities in a provenance system for data processing pipelines in a distributed cloud environment over a network interface. Thus, the data provisioning arrangement 400 may, for example, be configured to perform one or more of the method steps of FIG. 1, and/or one or more sequence steps of FIGS. 2a and 2b, and/or one or more of any steps otherwise described herein.

The managing arrangement 400 comprises a controller, e.g. device controlling circuitry, configured to cause obtainment of at least one declarative intent representing a configuration indicative of requirements and levels of priority for storage of provenance information for each of the data processing pipelines, and derivation of the requirements and levels of priority for storage of provenance information for each of the data processing pipelines based on the obtained at least one declarative intent, wherein one of the levels of priority—first level of priority—is higher than the other levels of priority—second levels of priority.

The controller is further configured to cause estimation of storage capacity for storage of provenance information in the provenance system based on the derived requirements and levels of priority, storage of the provenance information according to the derived requirements and levels of priority for storage of provenance information and for each of the data processing pipelines, and when actual storage consumption for storage of provenance information in the provenance system meets a threshold of storage capacity set based on the estimated storage capacity: reduction of a data amount for storage of provenance information of the second levels of priority in the provenance system.

The managing arrangement 400 for a configuration component comprises, as mentioned above, a controller (CNTR; e.g., control circuitry or a controlling module) 410, which may in turn comprise, (or be otherwise associated with; e.g., connected or connectable to), an obtainer 401, e.g. obtaining circuitry or obtaining module, configured to obtain at least one declarative intent representing a configuration indicative of requirements and levels of priority for storage of provenance information for each of the data processing pipelines (compare with step 101 of FIG. 1), and a deriver 402, e.g. deriving circuitry or deriving module, configured to the requirements and levels of priority for storage of provenance information for each of the data processing pipelines based on the obtained at least one declarative intent, wherein one of the levels of priority—first level of priority—is higher than the other levels of priority—second levels of priority (compare with step 102 of FIG. 1).

The CNTR 410 may further comprise, (or be otherwise associated with; e.g., connected or connectable to), an estimator 403, e.g. estimating circuitry or estimating module, configured to estimate storage capacity for storage of provenance information in the provenance system based on the derived requirements and levels of priority (compare with step 103 of FIG. 1), a storer 404, e.g. storing circuitry or storing module, configured to store the provenance information according to the derived requirements and levels of priority for storage of provenance information and for each of the data processing pipelines (compare with step 104 of FIG. 1), a monitorer 405, e.g. monitoring circuitry or monitoring module, configured to monitor when actual storage consumption for storage of provenance information in the provenance system meets a threshold of storage capacity set based on the estimated storage capacity (compare with step 105 of FIG. 1), and a reducer 406, e.g. reducing circuitry or reducing module, configured to reduce a data amount for storage of provenance information of the second levels of priority in the provenance system (compare with step 106 of FIG. 1).

In some embodiments, the CNTR 410 may further comprise, (or be otherwise associated with; e.g., connected or connectable to), a notifier 407, e.g. notifying circuitry or notifying module, configured to notify a client associated to the declarative intent that the stored provenance information is available for provision (compare with step 107 of FIG. 1), and a provider 408, e.g. providing circuitry or providing module, configured to provide the client with access to the stored provenance information over the network interface (compare with step 108 of FIG. 1).

The arrangement 400 may further comprise, (or be otherwise associated with; e.g., connected or connectable to), in some embodiments, a transceiver TX/RX 420, e.g. transceiving circuitry or transceiving module, configured to transmit and receive radio signals e.g. for obtaining from a client at least one declarative intent representing a configuration indicative of requirements and levels of priority for storage of provenance information for each of the data processing pipelines and/or for providing the client with access to the stored provenance information over the network interface.

Hence, in view of above arrangement, configuration of storage of provenance information in a provenance system for data processing pipelines in a distributed cloud environment over a network interface is enabled.

An advantage of some embodiments is that alternative approaches for managing provenance information in a provenance system for data processing pipelines in a distributed cloud environment over a network interface are provided.

Another advantage of some embodiments is that coarse/fine configuration controls and policy/rule frameworks for system operator(s) to tune the system may be alleviated.

Yet an advantage of some embodiments is that the cumbersome handling of the vast array of combinations of controls and rules to correctly configure the system controls may be alleviated.

Yet another advantage of some embodiments is that required provenance information is stored in the provenance system while conforming to the resource capacity limits at various locations in the distributed cloud environment.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 5:
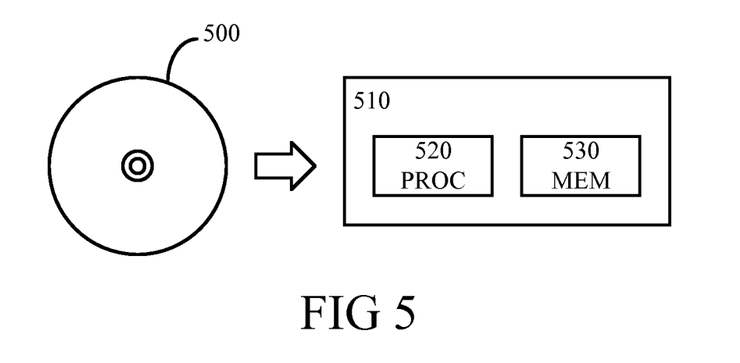
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processor, the computer program may be stored in a memory (MEM) 530 associated with or comprised in the data processor.

In some embodiments, the computer program may, when loaded into and run by the data processing unit, cause execution of method steps according to, for example, FIG. 1, and/or sequence steps according to, for example, FIGS. 2*a* and 2*b*, and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for managing provenance information associated with one or more interconnected provenance entities in a provenance system, the method being performed by a configuration component, the method comprising:
   obtaining a declarative intent for storage of provenance information for a processing pipeline, wherein the processing pipeline is part of a distributed cloud environment and the processing pipeline is configured to read in data, transform the data, and output transformed data;
   identifying a category of provenance information based on the declarative intent;
   deriving a first level of priority associated with the category of provenance information based on the declarative intent;
   estimating an amount of storage based on the category of provenance information and the first level of priority;
   storing the provenance information in a storage of provenance information;
   determining a data storage level associated with the provenance system is greater than a threshold, wherein the threshold is based on the estimated amount of storage; and
   reducing an amount of provenance information stored in the storage of provenance information as a result of determining the data storage level is greater than the threshold, wherein reducing the amount of provenance information stored in the storage of provenance information is based on a second level of priority.

2. The method of claim 1, wherein reducing the amount of provenance information stored in the storage of provenance information comprises transmitting a signal for causing:
   compressing the provenance information in the storage,
   removing indexing of the provenance information in the storage, and/or
   moving the provenance information in the storage to remote storage in the distributed cloud environment, wherein the provenance information is compressed or non-compressed.

3. The method of claim 1, wherein deriving the first level of priority is based on:
   an age of the processing pipeline,
   specific tags of the processing pipeline,
   specific clients/groups of clients associated with the processing pipeline, and/or
   specific data sources for the processing pipeline.

4. The method of claim 1, wherein the declarative intent is indicative of a time interval requirement, wherein the time interval requirement identifies a time interval during which the provenance information associated with the one or more interconnected provenance entities should be stored in the provenance system.

5. The method of claim 1, wherein the declarative intent is indicative of a continuation requirement for continuously storing provenance information associated with the one or more interconnected provenance entities in the provenance system.

6. The method of claim 1, further comprising:
   notifying a client associated with the declarative intent that the stored provenance information is available for provision.

7. The method of claim 6, further comprising:
   providing the client with access to the stored provenance information over a network interface.

8. The method of claim 6, further comprising:
   providing the client with data streams of the stored provenance information over a network interface.

9. The method of claim 8, wherein the provided data streams of the stored provenance information to the client serves as data for:
   debugging,
   analysis queries,
   scheduling, and/or
   optimizations.

10. The method of claim 1, wherein the provenance information comprises:
    information identifying a data collection location,
    information identifying a data collection purpose,
    information identifying context data,
    information identifying a person associated with collected data,
    information identifying a person with access to the collected data,
    attributes of the collected data,
    updates to the collected data,
    creation of the collected data, and/or
    lineage of collected data, depending on data type and an environment of collection.

11. The method of claim 1, wherein the one or more interconnected provenance entities in the provenance system represent one or more interconnected nodes of a graph structure and the interconnections represent edges and relationships between the nodes of a subgraph of the graph structure.

12. The method of claim 11, wherein the graph structure is a graph database.

13. The method of claim 1, wherein the configuration component comprises a plurality of sub-components each acting as a separate configuration component for a data processing pipeline.

14. The method of claim 1, wherein the stored provenance information relates to:
industrial robotics,
sensors in a building, and/or
production machines.

15. A computer program product comprising a non-transitory computer readable medium storing a computer program comprising instructions which when executed by processing circuitry causes the processing circuitry to perform the method of claim 1.

16. An arrangement for a configuration component adapted for managing provenance information associated with one or more interconnected provenance entities in a provenance system the arrangement comprising a controller configured to:
obtain a declarative intent for storage of provenance information for a processing pipeline, wherein the processing pipeline is part of a distributed cloud environment and the processing pipeline is configured to read in data, transform the data, and output transformed data;
identify a category of provenance information based on the declarative intent;
derive a first level of priority associated with the category of provenance information based on the declarative intent;
estimate an amount of storage based on the category of provenance information and the first level of priority;
store the provenance information in a storage of provenance information;
determine a data storage level associated with the provenance system is greater than a threshold, wherein the threshold is based on the estimated amount of storage; and
reduce an amount of provenance information stored in the storage of provenance information as a result of determining the data storage level is greater than the threshold, wherein reducing the amount of provenance information stored in the storage of provenance information is based on a second level of priority.

17. A configuration component comprising the arrangement according to claim 16.

18. A system comprising the arrangement according to claim 16.

19. The system according to claim 18, further comprising at least one client, a local storage, and a remote storage.

* * * * *